Jan. 23, 1968   J. HALLER   3,365,253
SELF-ALIGNING ANTIFRICTION-BEARING-EQUIPPED ROLLER
Filed Nov. 22, 1965   2 Sheets-Sheet 1
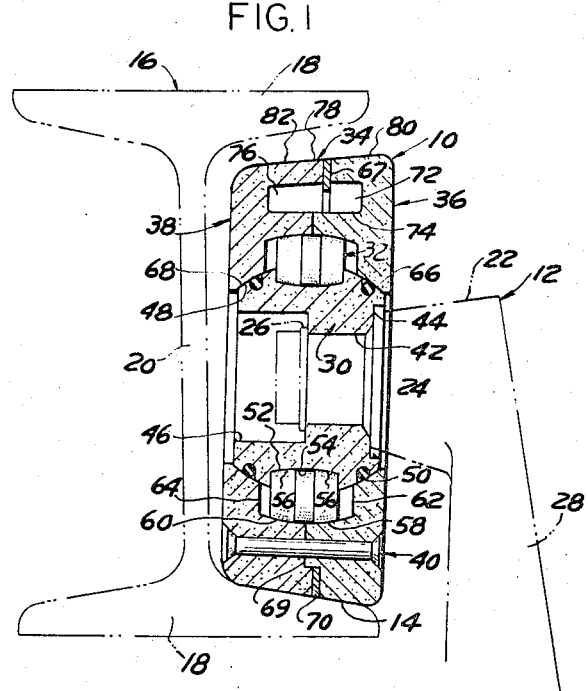
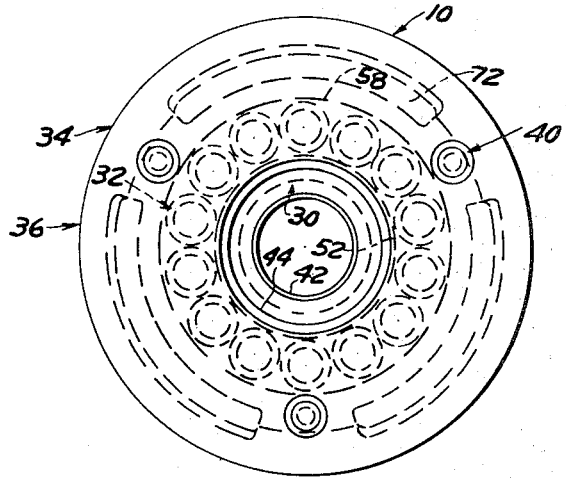
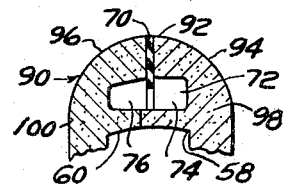
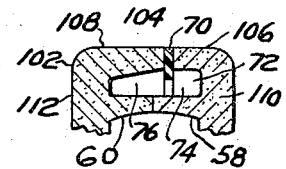
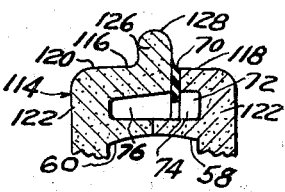
INVENTOR
JOHN HALLER
BY *Barthel & Bugbee*
ATTORNEYS Jan. 23, 1968  J. HALLER  3,365,253
SELF-ALIGNING ANTIFRICTION-BEARING-EQUIPPED ROLLER
Filed Nov. 22, 1965  2 Sheets-Sheet 2
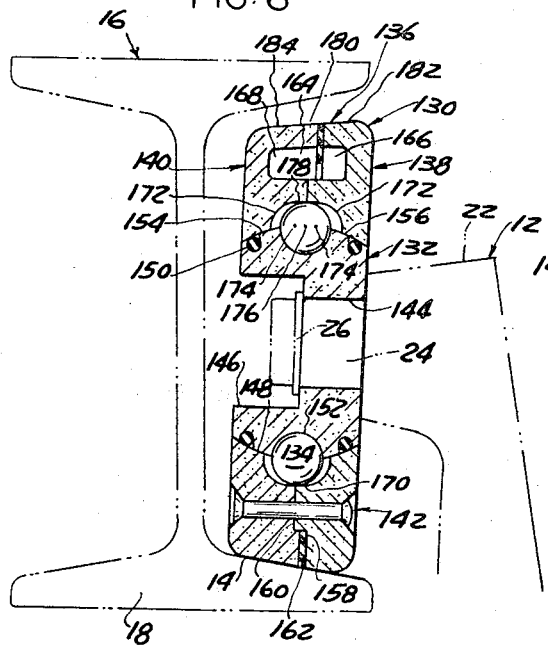
FIG. 6
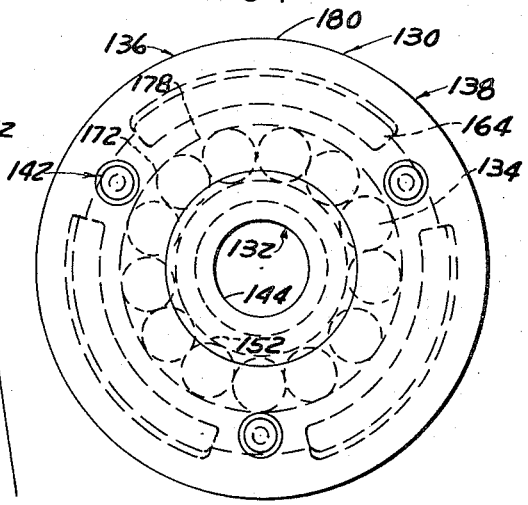
FIG. 7
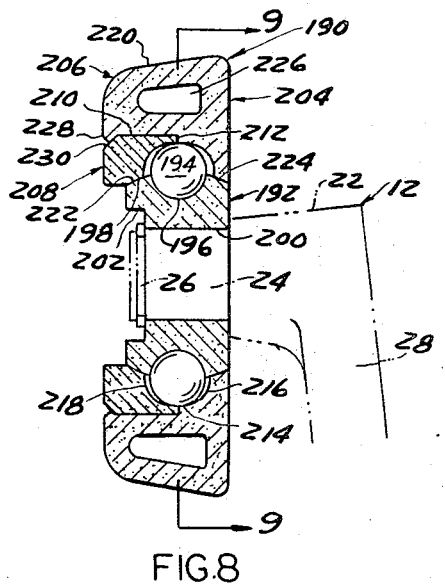
FIG. 8
FIG. 9
INVENTOR
JOHN HALLER
BY Barthel & Bugbee
ATTORNEYS

United States Patent Office 3,365,253
Patented Jan. 23, 1968

3,365,253
SELF-ALIGNING ANTIFRICTION-BEARING EQUIPPED ROLLER
John Haller, Northville, Mich., assignor to Federal-Mogul Corporation, Detroit, Mich., a corporation of Michigan
Filed Nov. 22, 1965, Ser. No. 509,050
14 Claims. (Cl. 308—190)

This invention relates to self-aligning antifriction bearings. Hitherto, antifriction bearing-equipped rollers, such as are used, for example, in overhead trolley conveyors, have been made of steel and other solid metals requiring expensive machining. Such prior rollers have only a narrow band of contact with the conveyor rail, and thereby concentrate the load in a narrow ribbon area. This has resulted in high wear and required frequent lubrication and repairs.

The present invention eliminates these disadvantages by providing a self-aligning antifriction bearing which is so constructed and arranged that its components may be formed wholly or principally of sintered powdered material which may be heat-treated if desired and which require little or no machining; which is inexpensive to manufacture, and is well sealed against the intrusion of dirt or other forms of matter; which includes a lubricant reservoir containing a lifetime supply of lubricant fed to the bearing surfaces in metered amounts; and which is well adapted for use as a trolley conveyor roller by adapting itself automatically to irregularities of the conveyor track on which it rolls, such as an I-beam, and easily rounding the corners of such a track with a large self-aligning tilting capability with a wide continuous contact zone of the roller over the entire width of the track, hence giving a much greater load-carrying capacity with minimum wear in comparison with prior trolley conveyor rollers.

Other objects and advantages of the invention will become apparent during the course of the following description of the accompanying drawings, wherein:

FIGURE 1 is a central vertical section through a self-aligning sintered-powder antifriction-bearing-equipped roller as applied to a trolley conveyor track and hanger, shown in dotted lines;

FIGURE 2 is a right-hand side elevation of the roller shown in FIGURE 1;

FIGURES 3, 4 and 5 are fragmentary central vertical sections through modified rim shapes of that shown in FIGURE 1;

FIGURE 6 is a central vertical section through a self-aligning sintered-powder antifriction-bearing-equipped roller using antifriction balls, as applied to a trolley conveyor track and hanger, shown in dotted lines;

FIGURE 7 is a right-hand side elevation of the roller shown in FIGURE 6;

FIGURE 8 is a central vertical section through a further modified self-aligning sintered-powder antifriction-bearing-equipped roller also using antifriction balls, with a trolley conveyor hanger shown in dotted lines; and FIGURE 9 is a central vertical cross-section through the further modified roller of FIGURE 8, taken along the line 9—9 therein.

Referring to the drawings in detail, FIGURE 1 shows a self-aligning sintered-powder antifriction-bearing-equipped roller, generally designated 10, according to one form of the invention as mounted on an overhead trolley conveyor hanger arm 12 and rolling along the roller path surface 14 of an overhead trolley conveyor track or rail 16. The hanger arm 12 and rail or track 16 are conventional and their details are beyond the scope of the present invention. The track 16 is ordinarily of I-beam form with upper and lower flanges 18 containing the inclined roller path surfaces 14 on their inner faces and interconnected by a web 20. The trolley conveyor arm 12 is of roughly L-shaped form with an upper approximately horizontal portion 22 terminating in a reduced diameter part 24 which is grooved to receive a snap ring 26 whereby the bearing 10 is retained in position upon the arm portion 22. The arm 12 has an inclined portion 28 extending downward to a suitable load carrier, such as a hook, and may include a connecting member (not shown) interconnecting a plurality of the arms 12. The self-aligning sintered-powder antifriction-bearing-equipped roller 10 consists generally of an inner race 30, multiple circumferentially-spaced barrel-shaped antifriction bearing rolls 32, a compound outer race 34 made up of outer and inner components 36 and 38 respectively, and fasteners 40 tying the outer race components 36 and 38 together.

The inner race 30 is preferably of sintered powdered metal and has a central bore 42 which receives the reduced diameter portion 24 of the hanger arm 12, and shallow outer and deep inner counterbores 44 and 46 respectively. The inner race 30 has an external spherical surface 48 which is annularly grooved near its opposite edges to receive sealing O-rings 50. The inner race 30 is provided with an annular external spherical concave roll channel 52, and each antifriction roll 32 includes a central flat portion 54 flanked by spherical convex end portions 56 having the same radius of curvature as the roll channel 52 and also the same curvature as correspondingly-curved internal concave spherical roll channels 58 and 60 respectively formed in the internal annular grooves 62 and 64 of the outer race roller halves 36 and 38 respectively. The center of curvature of the roll channels 58 and 60 lies along the axis of the central bore 42.

The components 36 and 38 of the outer race 34 have aligned spherical concentric concave surfaces 66 and 68 of the same curvature as the convex surface 48, and abut one another along stepped abutment surfaces 67 and 69 respectively, the outer portions of which are separated from one another by a gasket 70 adapted to prevent undesired leakage from arcuate lubricant reservoirs 72. The latter are composed of arcuate facing recesses 74 and 76 in the halves 36 and 38. Between the circumferentially-spaced ends of the arcuate lubricant reservoirs 72, the halves 36 and 38 are drilled axially to receive headed rivets or other fasteners 40. The outer race 34 is provided with a tapered or frustoconical surface 78 which rolls upon the inclined roller pathway surface 14 of the trolley conveyor track or rail 16, and is composed of aligned tapered surfaces 80 and 82 disposed upon the halves 36 and 38.

The modified outer race 90 shown in FIGURE 3 is of generally similar construction to the outer race 34 of FIGURES 1 and 2, and differs from it in having a toroidal outer surface 92 composed of matching half surfaces 94 and 96 disposed upon components 98 and 100 of sintered powdered material. The outer race 90 is intended to roll in a correspondingly-curved concave roller pathway in a trolley conveyor rail or track (not shown) which is otherwise similar to the track 16.

The further modified outer race roller 102 shown in FIGURE 4 differs from the outer races 34 and 90 of FIGURES 1 and 3 by having a cylindrical peripheral surface 104 composed of matching half surfaces 106 and 108 disposed upon components 110 and 112 of sintered powdered material. The roller 102 is intended to roll upon a correspondingly flat roller pathway in a trolley conveyor rail or track (not shown) similar to the track 16.

The still further modified outer race 114 shown in FIGURE 5 differs from the races 34, 90 and 102 of FIGURES 1, 3 and 4 by having a ridged cylindrical surface 116 composed of matching half surfaces 118 and 120 disposed upon components 122 and 124 respectively of sintered powdered material and separated from one another by a rib 126 with a cylindrically-curved top surface 128. The outer race 114 is intended to roll upon a flat roller pathway with a central groove receiving the rib 126 but otherwise similar to the roller pathway 14 of the trolley conveyor track or rail 16 of FIGURE 1.

During manufacture, the inner race 30 and the outer race components 36 and 38 of the outer race 34 are formed of sintered powdered material, such as sintered powdered metal or sintered powdered nylon plastic, by conventional molding and sintering processes carried out in briquetting presses and sintering furnaces. Such procedures are well known to those skilled in the art of powder metallurgy. These procedures produce the various parts of the self-aligning bearing 10 of accurate dimensions without requiring expensive machining. A full set of the antifriction rolls 32 are then assembled in their respective locations, after which the outer race roller components 36 and 38 are secured to one another around the inner race 30 by the fasteners 40.

In operation, the self-aligning sintered-powder antifriction-bearing-equipped roller 10, mounted on its hanger arm 12 or other suitable mount, rotates as it rolls along its roller pathway surface 14 on its conveyor track or rail 16. During such travel, the roller 10 is lubricated by oil or other suitable lubricant in the arcuate lubricant reservoirs 72 passing through the pores of the sintered powdered material of the outer race roller 34, 90, 102 or 114 as the case may be. At the same time, the outer race 34, 90, 102 or 114 rocks freely and self-aligningly on its concave surfaces 66 68, sliding upon the convex spherical surfaces 48 while the antifriction bearing rolls 32 rotate in their annular channels between the outer and inner races 34 and 30 respectively. The O-rings 50 effectively resist the intrusion of dirt or other foreign matter as this self-aligning rocking occurs, caused by irregularities in the roller path 14 of the rail or track 16, or in traversing turns thereof.

The modified self-aligning sintered-powder antifriction-bearing-equipped roller, generally designated 130, shown in FIGURES 6 and 7, is also shown for purposes of exemplification as mounted upon an overhead trolley conveyor hanger arm 12 to roll upon the roller pathway 14 of an overhead track or rail 16, such as has been described above in connection with FIGURE 1. The modified bearing 130 consists generally of an inner race 132, multiple circumferentially-spaced antifriction bearing balls 134 and a compound outer race 136 made up of outer and inner components 138 and 140 respectively of sintered powder material which are drilled to receive fasteners 142 tying the outer roller components 138 and 140 together. As before, the inner race 132 has a central bore 144 which receives the reduced diameter portion 24 of the hanger arm 12, and has a counterbore 146 on the inner side of the inner race 132. The inner race 132, as before, has an external spherical surface 148 which is annularly grooved near its opposite edges to receive sealing O-rings 150. The inner race 132 is provided with an external annular toroidal concave bearing ball channel 152 in which the bearing balls 134 roll.

The outer race roller components 138 and 140 have aligned concentric spherical concave surfaces 154 and 156 of substantially the same curvature as the spherical convex surface 148 of the inner race 132. The outer race roller components 138 and 140 abut one another along stepped abutment surfaces 158 and 160 respectively, the outer portions of which are separated from one another by a gasket 162 for preventing undesired leakage from arcuate lubricant reservoirs 164. As before the latter are composed of arcuate facing recesses 166 and 168 in the outer race roller components 138 and 140. Between the circumferentially-spaced ends of the arcuate lubricant reservoirs 164, the outer race roller components 138 and 140 are drilled axially to receive the fasteners 142, which may also conveniently comprise headed rivets.

The outer race 136 is provided with an annular bearing ball channel 170 which is laterally wider than the bearing balls 134 and which has oppositely-facing toroidal portions 172 of the same radii as the balls 134 but with their centers of cross-sectional curvature located at points 174 spaced apart from one another laterally and also spaced on opposite sides of the ball centers 176, leaving an annular flattened zone 178 extending between them. This arrangement provides clearance for the bearing balls 134 during self-aligning rocking of the outer and inner races 136 and 132 relatively to one another during operation, as described below. As before, the outer race 136 is provided with a tapered or frustoconical surface 180 composed of aligned components 182 and 184 respectively upon the outer race components 138 and 140 respectively and separated from one another by the gasket 162. It will be understood that this outer race roller surface 180 may also take the modified forms shown in FIGURES 3, 4 and 5, to fit correspondingly configured pathways on the conveyor track or rail 16. As shown in FIGURE 6, the frustoconical surface 180 rolls upon the inclined roller pathway surface 14 of the lower flange 18 of the trolley conveyor track or rail 16.

The further modified self-aligning sintered-powder antifriction-bearing-equipped roller, generally designated 190, shown in FIGURES 8 and 9 resembles the modified roller 130 of FIGURES 6 and 7, to the extent that it has a somewhat similar inner race 192 and similar multiple circumferentially-spaced antifriction bearing balls 194 rolling in an external annular toroidal concave bearing ball channel 196 in the external spherical surface 198 of the inner race 192. The latter is similarly equipped with a similar central bore 200 for receiving the reduced diameter end portion 24 of the upper portion 22 of the trolley conveyor arm 12, and a shallower counterbore 202 providing clearance for the snap ring 26.

The compound outer race 204, however, while consisting of separate components 206 and 208 respectively, arranges these in a different way. The outer component 204 is counterbored as at 210 to receive the smaller diameter inner component 208 with the two components meeting at an abutment shoulder 212 and containing a laterally-widened annular bearing ball channel 214. The bearing ball channel 214 is similar to the bearing ball channel 170 of FIGURE 6 and has portions 216 and 218 which are similarly divided between the outer race components 206 and 208 with similar center of curvature relationships.

The outer race component 206 of the further modified bearing 190 is provided with the entire frustoconical or tapered surface 220 which rolls upon the inclined roller pathway surface 14 of the lower flange 18 of the trolley conveyor track or rail 16. The outer race roller components 206 and 208 on opposite sides of the ball channel 196 have concentric concave spherical surfaces 222 and 224 which mate with the convex spherical surface 198 of the inner race 192. The race component 206 contains the entire lubricant reservoir 226 which, as shown in FIGURE 9, is continuously annular rather than composed of spaced arcuate portions as in FIGURES 6 and 7. After assembly of the bearing balls 194 in their respective ball path 196 against the ball path portion 216, the outer race component 208 is inserted in the counterbore 210 and secured therein by spinning or staking as at 228, rather than by the use of the fasteners 142 of FIGURE 6. This procedure upsets the sintered powdered metal of the outer race component 206 so as to displace it against a bevel portion 230 at the outer external edge of the race component 208, thereby locking the component parts together.

In the operation of either of the modified self-aligning rollers 130 or 190, as the tapered surface 180 or 220 of the outer race 136 or 204 rolls along the inclined roller pathway 14 of the overhead conveyor track or rail 16 and encounters irregularities or turns, the outer race 136 or 204 and inner race 132 or 192 rock relatively to one another about their respective mating spherical surfaces 148, 154 and 156 or 198, 222 and 224, thereby providing self-alignment thereof relatively to one another. During such rocking, the bearing balls 134 and 194 shift laterally in the widened ball channels 170 and 214. At the same time, lubricant in the reservoir 164 or 226 passes through the pores of the sintered powdered metal of the respective bearing surfaces to provide lubrication for the life of the roller.

What I claim is:

1. A self-aligning antifriction-bearing-equipped roller for rolling along a pathway, said roller comprising
    an inner race member having an external convex spherical bearing surface thereon with an annular external antifriction bearing element channel therearound,
    a compound outer race member including a pair of annular outer race components composed of sintered powdered material secured to one another in abutting relationship and having an annular external pathway-engaging surface thereon,
        said outer race member having in the interior thereof an annular internal concave spherical bearing surface disposed in relatively-rocking mating engagement with said external convex spherical bearing surface of said inner race member,
            said outer race member also having therein an annular internal antifriction bearing element channel extending around the interior thereof in oppositely-facing relationship with said external channel,
    and multiple rollable antifriction bearing elements disposed in an annular path between said channels in rolling engagement with the opposing surfaces thereof,
        one of said channels having a width exceeding the width of said antifriction bearing elements whereby to facilitate said relative rocking engagement.

2. A self-aligning antifriction-bearing-equipped roller, according to claim 1, wherein said inner race is also composed of sintered powdered metal.

3. A self-aligning antifriction-bearing-equipped roller, according to claim 1, wherein said outer race member has lubricant reservoir means therein disposed between said outer race channel and the peripheral surface of said outer race member.

4. A self-aligning antifriction-bearing-equipped roller, according to claim 3, wherein said outer race member has said lubricant reservoir means disposed in an annular path.

5. A self-aligning antifriction-bearing-equipped roller, according to claim 1, wherein said antifriction bearing elements comprise approximately barrel-shaped rolls.

6. A self-aligning antifriction-bearing-equipped roller, according to claim 5, wherein said rolls have opposite end portions of arcuate longitudinal section and a central annular zone of flatter configuration.

7. A self-aligning antifriction-bearing-equipped roller, according to claim 1, wherein said outer race components have approximately radial meeting surfaces disposed in face-to-face abutting relationship.

8. A self-aligning antifriction-bearing-equipped roller, according to claim 1, wherein said antifriction bearing elements comprise bearing balls.

9. A self-aligning antifriction-bearing-equipped roller, according to claim 1, wherein one of said outer race components has a counterbore therein and wherein the other of said components is secured in said counterbore.

10. A self-aligning anitfriction-bearing-equipped roller, according to claim 1, wherein said annular external pathway-engaging surface is frustoconical.

11. A self-aligning antifriction-bearing-equipped roller, according to claim 1, wherein said annular external pathway-engaging surface is arcuate.

12. A self-aligning antifriction-bearing-equipped roller, according to claim 1, wherein said annular external pathway-engaging surface is cylindrical.

13. A self-aligning antifriction-bearing-equipped roller, according to claim 12, wherein said cylindrical surface has an annular radially-projecting rib extending therearound.

14. A self-aligning antifriction-bearing-equipped roller, according to claim 1, wherein said inner race member has axially-spaced annular recesses extending therearound, and wherein annular sealing elements are disposed in said recesses in sealing engagement with said internal concave spherical surface.

References Cited

UNITED STATES PATENTS 2,421,685   6/1947   Crot et al. _____ 308—18

MARTIN P. SCHWADRON, *Primary Examiner.*

FRANK SUSKO, *Examiner.*